(12) United States Patent
Song et al.

(10) Patent No.: US 11,725,635 B1
(45) Date of Patent: Aug. 15, 2023

(54) FABRIC-BASED INFLATABLE STRUCTURES WITH TEXTURED PATTERN DESIGNS AND VARIABLE STIFFNESS

(71) Applicant: Toyota Motor Engineering & Manufacturing North America, Inc., Plano, TX (US)

(72) Inventors: Yuyang Song, Ann Arbor, MI (US); Masato Tanaka, Ann Arbor, MI (US); Tsuyoshi Nomura, Nagoya (JP); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/704,588

(22) Filed: Mar. 25, 2022

(51) Int. Cl.
| | | |
|---|---|---|
| *F03G 7/06* | (2006.01) | |
| *H02N 13/00* | (2006.01) | |
| *H05B 3/00* | (2006.01) | |
| *B25J 9/10* | (2006.01) | |

(52) U.S. Cl.
CPC ......... *F03G 7/06114* (2021.08); *H02N 13/00* (2013.01); *H05B 3/0004* (2013.01); *B25J 9/1075* (2013.01)

(58) Field of Classification Search
CPC ... F03G 7/06114; H02N 13/00; H05B 3/0004; B25J 9/1075
USPC .................................................. 60/527–529
See application file for complete search history.

(56) References Cited

U.S. PATENT DOCUMENTS

| | | | |
|---|---|---|---|
| 9,140,649 B2 | 9/2015 | Hart et al. | |
| 10,363,670 B1* | 7/2019 | Gundling | .......... B25J 18/06 |
| 10,377,536 B2 | 7/2019 | Niiyama et al. | |
| 10,946,535 B2* | 3/2021 | Gandhi | .......... B62D 57/02 |
| 2009/0043288 A1* | 2/2009 | Petrakis | .......... A61M 31/002 |
| | | | 60/527 |
| 2020/0130321 A1* | 4/2020 | Gandhi | .......... B32B 3/30 |
| 2022/0001530 A1* | 1/2022 | Sameoto et al. | .......... B32B 27/283 |

OTHER PUBLICATIONS

Liao et al., "Fully-Printable Soft Actuator with Variable Sliffness by Phase Transition and Hydraulic Regulations," Actuators 2021, vol. 10, issue 10, pp. 1-14.

(Continued)

*Primary Examiner* — Hoang M Nguyen
(74) *Attorney, Agent, or Firm* — Christopher G. Darrow; Darrow Mustafa PC (57) ABSTRACT

An inflatable structure includes an inflatable membrane with an outer surface, and a skin with a textured space-filling Turing pattern disposed on the outer surface of the inflatable membrane. A variable stiffness filament is coupled to the inflatable structure and the variable stiffness filament has a first stiffness at a first temperature and a second stiffness different than the first stiffness at a second temperature different than the first temperature. An electrical energy source is included and in electrical communication with the variable stiffness filament, and the electrical energy source is configured to apply Joule heating to and increase a temperature of the variable stiffness filament from the first temperature to the second temperature such variable stiffness actively controls a stiffness of the inflatable structure.

20 Claims, 6 Drawing Sheets

(56) References Cited

OTHER PUBLICATIONS

Yang et al., "Reprogrammable soft actuation and shape-shifting via tensile jamming," Science Advances, vol. 7, issue 40, Oct. 1, 2021, pp. 1-10.
Diller at al., "A lightweight, low-power electroadhesive clutch and spring for exoskeleton actuation," 2016 IEEE International Conference on Robotics and Automation (ICRA), pp. 682-689.
Fitzgerald et al., "A Review of Jamming Actuation in Soft Robotics," Actuators 2020, vol. 9, No. 4, pp. 1-31.
Must et al., "A variable-stiffness tendril-like soft robot based on reversible osmotic actuation," Nature Communications, vol. 10, No. 344, 2019, pp. 1-8.

* cited by examiner

FABRIC-BASED INFLATABLE STRUCTURES WITH TEXTURED PATTERN DESIGNS AND VARIABLE STIFFNESS

TECHNICAL FIELD

The present disclosure generally relates to inflatable structures and, more particularly, to inflatable shape-morphing structures.

BACKGROUND

"Soft" robotics and actuators use compliant materials and structures to provide flexible and adaptable grasping and actuation for a range of activities including picking up and/or moving delicate and breakable objects. In addition, such "soft structures" are controlled or actuated using electrostatic forces (e.g., applied voltage to dielectric elastomer actuators), thermal forces (e.g., heating and cooling of shape memory polymers), and/or pressure forces (e.g., inflating and deflating inflatable shape-morphing structures).

Traditional inflatable shape-morphing structures are designed and manufactured with isotropic materials (e.g., fabrics or polymer sheets) such that shape-morphing of a given soft structure is controlled by its initial shape, stitch patterns, and use of different materials. In addition, the design and manufacture of a traditional inflatable shape-morphing structure relies on a designer's expertise and knowledge of inflatable shape-morphing structures combined with trial and error manufacturing to arrive at a desired final shape when inflated.

The present disclosure addresses the issues of designing and manufacturing inflatable shape-morphing structures, among other issues related to inflatable shape-morphing structures.

SUMMARY

This section provides a general summary of the disclosure, and is not a comprehensive disclosure of its full scope or all of its features.

In one form of the present disclosure, an inflatable structure includes an inflatable membrane with a surface, a textured space-filling Turing pattern disposed on the surface, and a variable stiffness device coupled to and configured to actively control stiffness of the inflatable structure.

In another form of the present disclosure, an inflatable structure includes an inflatable membrane with a surface, and a skin with a textured space-filling Turing pattern disposed on the surface of the inflatable membrane. Also, a variable stiffness filament is coupled to and configured to actively control a stiffness of the inflatable membrane.

In still another form of the present disclosure, an inflatable structure includes an inflatable membrane with an outer surface, and a skin with a textured space-filling Turing pattern permanently bonded to the outer surface of the or removably disposed on the outer surface of the inflatable membrane. A variable stiffness filament is coupled to and configured to actively control stiffness of the inflatable membrane. Also, the variable stiffness filament has a first stiffness at a first temperature and a second stiffness different than the first stiffness at a second temperature different than the first temperature. An electrical energy source is included and in electrical communication with the variable stiffness filament, and the electrical energy source is configured to apply Joule heating to and increase a temperature of the variable stiffness filament from the first temperature to the second temperature.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure generally relates to an inflatable structure with a textured space-filling Turing pattern and an independent variable stiffness device. The textured space-filling Turing pattern enhances bending and/or shape-forming of the inflatable structure and the variable stiffness device (e.g., a variable stiffness filament) enhances the strength or stiffness of the inflatable structure. As used herein, the term "stiffness" refers to extent or quantity that the variable stiffness device, inflatable structure and/or inflatable membrane resist(s) deformation in response to an applied force. In some variations, the inflatable structure includes an inflatable membrane and a skin with the textured space-filling Turing pattern. And in such variations, the skin with the textured space-filling Turing pattern can be adhesively bonded or sewn onto inflatable membrane or the skin with the texture space-filling Turing pattern can slide over or onto the inflatable membrane and be removable.

Figure 1:
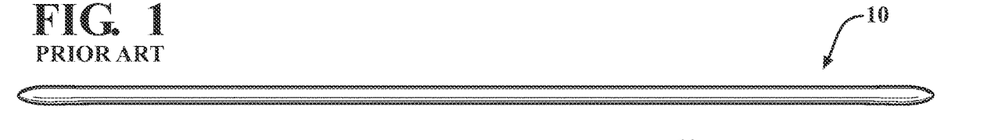
FIG. 1 is a side view of an inflatable shape-morphing structure in an un-inflated state.
Figure 2:
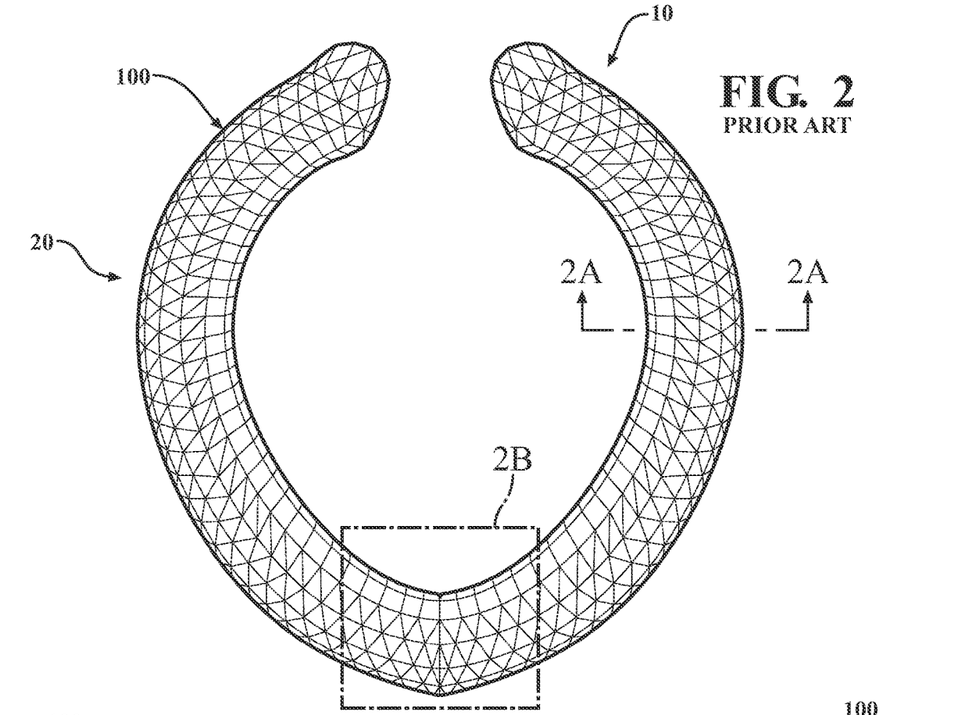
FIG. 2 is a side view of the inflatable shape-morphing structure in FIG. 1 in an inflated state.
Figure 2A:
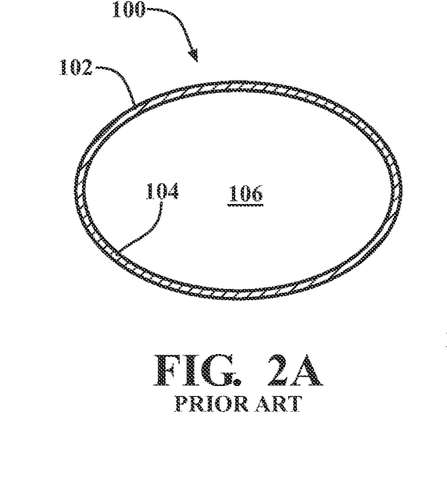
FIG. 2A is a cross-sectional view of section 2A-2A in FIG. 2.

Referring now to FIGS. 1 and 2, a side view of an inflatable structure 10 in an uninflated state is shown in FIG. 1 and a side view of the inflatable structure 10 in an inflated state is shown in FIG. 2. The inflatable structure 10 is formed from a sheet 100 with an outer surface 102, an inner surface 104 and an interior 106 as shown in FIG. 2A. Also, the sheet 100 is a material that maintains or holds pressure within the interior 106 such that the inflatable structure 10, and other inflatable shape-morphing structures disclosed herein, inflates into and has a desired final shape 20.

Figure 2B:
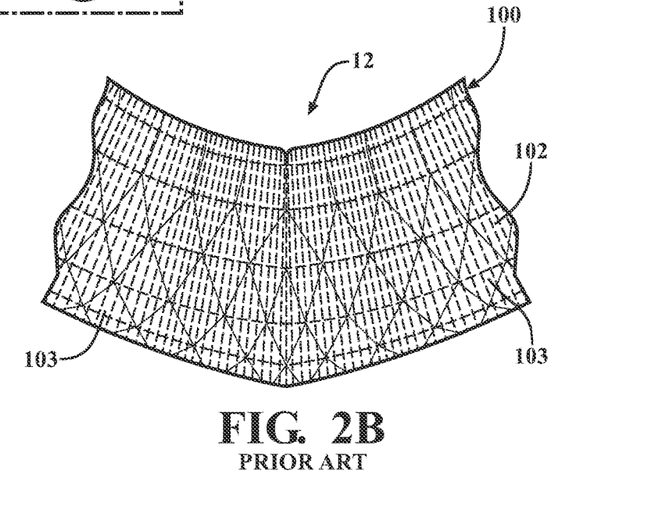
FIG. 2B is an enlarged view of section 2B in FIG. 2.

Referring to FIG. 2B, an enlarged view of section 2B in FIG. 2 is shown. The sheet 100 has stitching 103 configured to control shape-morphing of the inflatable structure 10 during pressurizing (inflating) of the interior 106. And as shown in FIG. 2B, the stitching 103 is not regularly or evenly spaced at a bend portion 12 such that the inflatable structure 10 in the uninflated state (FIG. 1) expands and deflects at the bend portion 12 during inflation. It should be understood that the inflatable structure 10 includes additional stitching 103 along its outer surface 102 such that the desired final shape 20 is formed when inflated. However, designing and manufacturing the initial (uninflated) inflatable structure 10 such that the inflatable structure 10 in an inflated state has the desired final shape 20 can be a time and cost intensive process.

Figure 3A:
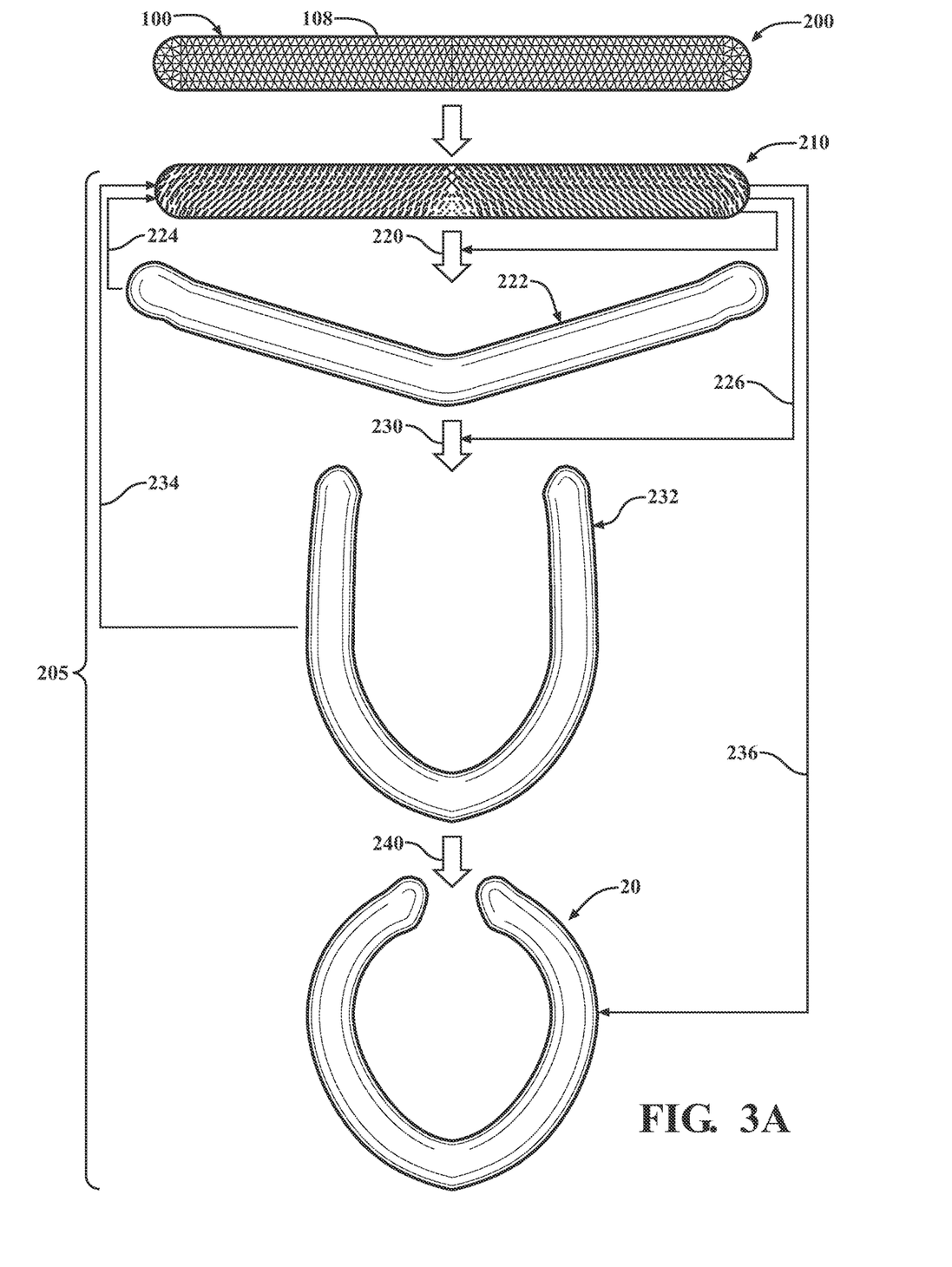
FIG. 3A illustrates a series of steps for a method of designing an inflatable shape-morphing structure according to the teachings of the present disclosure.
Figure 3B:
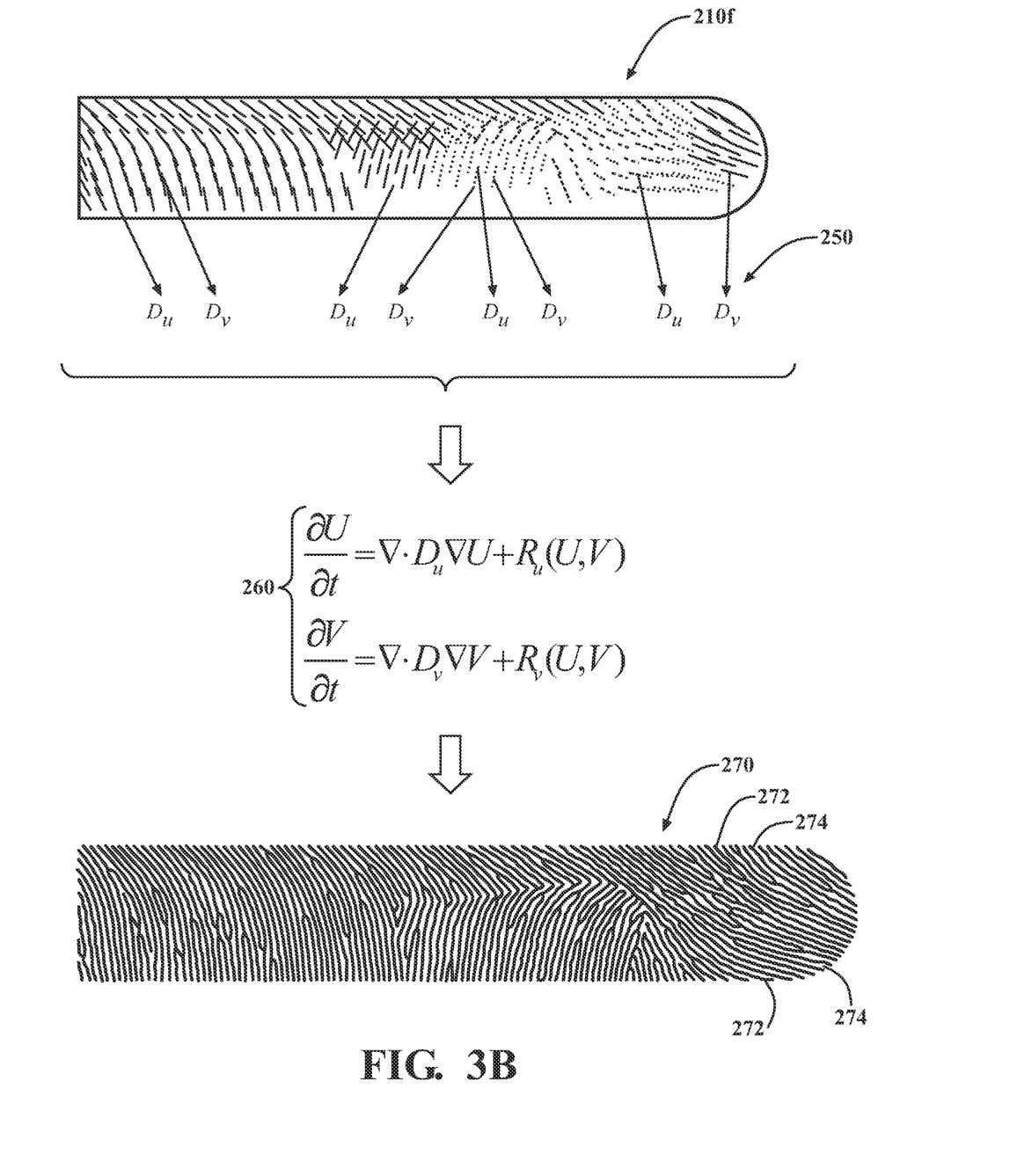
FIG. 3B illustrates additional steps for a method of designing an inflatable shape-morphing structure according to the teachings of the present disclosure.

Referring now to FIGS. 3A and 3B, steps for a method of automated designing of inflatable structures according to the teachings of the present disclosure are shown. Particularly, and assuming an inflatable structure 10 with the desired final shape 20 is desired, FIG. 3A shows a finite element mesh 108 is generated for the sheet 100 of the inflatable structure 10 at 200 and a topology optimization analysis of the sheet 100 is performed at 205. The topology optimization analysis 205 includes an iterative process where a tensor (e.g., a $2^{nd}$ order orientation tensor) is assigned or generated for at least a subset of the elements of the finite element mesh 108 at 210 using a topology optimization model. Inflation of the inflatable structure 10 with an initial set of tensors 212 is simulated at 220, and feedback 224 on the resulting inflated shape 222 compared to the desired final shape 20 is provided to the topology optimization model to generate, update and/or modify the initial set of tensors. Inflating the inflatable structure 10 with a revised or updated set of tensors 226 is simulated at 230, and additional feedback 234 on a revised inflated shape 232 compared to the desired final shape 20 is provided to the topology optimization model to generate, update and/or modify the most recent set of tensors. This iteration (i.e., optimization) continues until a set of revised tensors 236 results in simulation 240 of the inflatable shape-morphing structure 10 into the desired final shape 20 and/or a shape within a predefined tolerance of the desired final shape 20. Accordingly, the topology optimization analysis provides a plurality of tensors for the sheet 100, that if present in a sheet from which the inflatable structure 10 was formed, would result in or provide for an inflatable shape-morphing structure 10 inflating into the desired final shape 20 or to within the predefined tolerance of the desired final shape 20.

Referring to FIG. 3B, a final set of tensors (i.e., revised tensors 236) for a completed or finished topology optimization analysis is shown at 210f (only one-half of the topology optimization analysis shown) and the final set of tensors is used to generate a space-filling Turing pattern 270 for the inflatable shape-morphing structure 10 (e.g., for the outer surface 102 and/or the inner surface 104 of the sheet 100). In some variations, the space-filling Turing pattern 270 is generated or calculated using a Turing reaction-diffusion system with a mathematical model representing two hypothetical chemical substances (U and V) that diffuse in space around each other and enhance or suppress the reproduction of each chemical substance. In such variations, the dimensionless equations for the Turing reaction-diffusion system can be:

$$\frac{\partial U}{\partial t} = \nabla \cdot D_u \nabla U + R_u(U, V) \qquad \text{Eqn. 1}$$

$$\frac{\partial V}{\partial t} = \nabla \cdot D_v \nabla V + R_v(U, V) \qquad \text{Eqn. 2}$$

where:
U, V=hypothetical chemical substances;
$D_u$, $D_v$=anisotropic diffusion coefficients for U, V; and
Ru, Rv=interactive reaction terms for U, V.

For example, see Dede et al., "Inverse design of microchannel fluid flow networks using Turing pattern dehomogenization", Structural and Multidisciplinary Optimization (2020) 62:2203-2210, which is incorporated herein by reference. Also, $D_u$, $D_v$, $R_u$, and Rv can be defined as:

$$D_u(\bar{u}) = (L_u - W_u)\bar{u} \otimes \bar{u}, \ W_u \delta_{ij} \qquad \text{Eqn. 3}$$

$$D_v(\bar{u}) = (L_v - W_v)\bar{u} \otimes \bar{u} + W_v \delta_{ij} \qquad \text{Eqn. 4}$$

$$R_u(U,V) = (a_u U + b_u V + c_u) - d_u U \qquad \text{Eqn. 5}$$

$$R_v(U,V) = (a_v U + b_v V + c_v) - d_v U \qquad \text{Eqn. 6}$$

where:

$$L_u = l_u^2 W_u \qquad \text{Eqn. 7}$$

$$W_u = (w_u w)^2 \qquad \text{Eqn. 8}$$

$$L_v = l_v^2 W_v \qquad \text{Eqn. 9}$$

$$W_v = (w_v w)^2 \qquad \text{Eqn. 10}$$

and:
$l_v$, $l_u$=magnitude of anisotropy parameter for U, V, respectively;
$w_v$, $w_u$=channel pitch parameter for U, V, respectively, for generated pattern;
w=lateral magnitude of diffusion; and
$\delta_{ij}$=Kronecker delta.

Each of the plurality of tensors from the topology optimization analysis shown at 210f is substituted for a corresponding $2^{nd}$ order sensor $\bar{u} \otimes \bar{u}$ (where $\otimes$ is the dyadic product operator) in Equations 3 and 4 such that a plurality of diffusion coefficients Du, Dv are calculated. Also, by aligning the principal axis of the diffusion tensors with the corresponding orientation tensors from the topology optimization analysis, the orientation of the space filling Turing pattern is controlled. The reaction-diffusion Equations 1 and 2 are calculated as a function of time until an equilibrium state for the reaction-diffusion of the chemical substances U, V is reached and the space-filling Turing pattern 270 with alternating layers or elements 272, 274 (referred to herein simply as "elements 282, 284") is formed. For example, and for the space-filling Turing pattern 270 shown in FIG. 3B, the following values for the coefficients (parameters) were used: $l_u=1$; $l_v=1$; $w_u^2=0.02$, $w_v^2=0.5$, $w=0.12$; $a_u=0.08$; $b_u=0.08$; $cu=0.04$; $d_u=0.03$; $a_v=0.1$, $b_v=0$; $c_v=-0.15$; and $d_v=0.08$. In addition, initial values for U and V between 0 and 1 were used. Accordingly, the space-filling Turing pattern 270 is a function of the plurality of tensors determined from the topology optimization analysis that resulted in the uninflated inflatable shape-morphing structure 10 inflating into the desired final shape 20.

Figure 4:
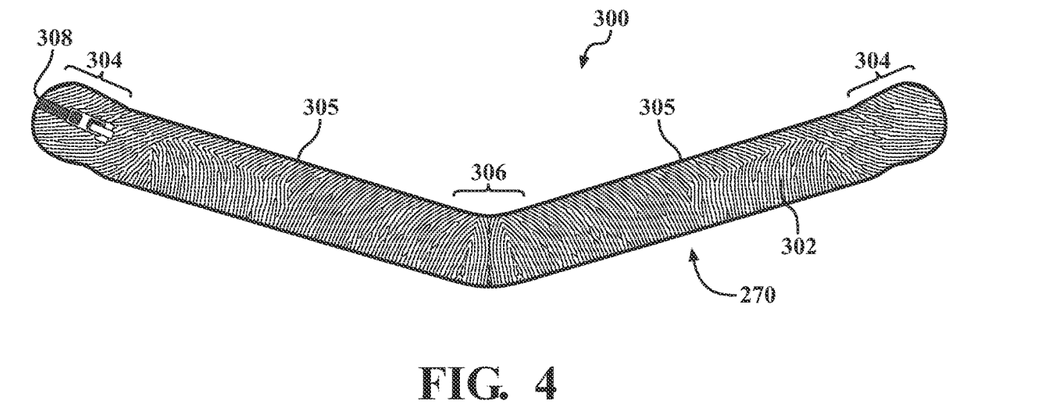
FIG. 4 is a side view of a skin for an inflatable shape-morphing structure according to the teachings of the present disclosure.
Figure 5:
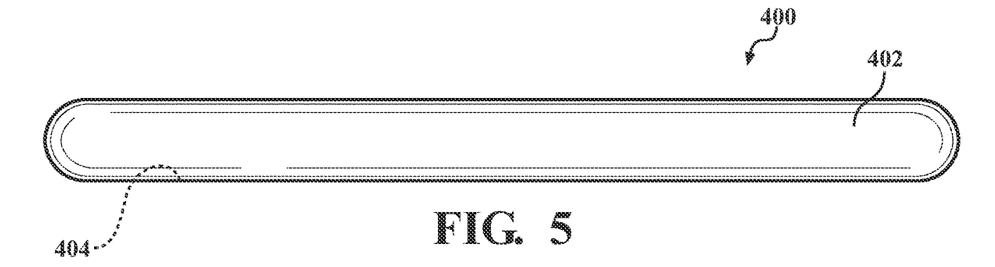
FIG. 5 is a side view of an inflatable membrane for an inflatable shape-morphing structure according to the teachings of the present disclosure.

In one form of the present disclosure, an inflatable structure includes or is formed from a skin with a textured surface that has or mimics a space-filling Turing pattern and the skin is attached to or disposed on an inflatable membrane. That is, a skin with the texture space-filling Turing pattern is formed separately from an inflatable membrane to which it is attached, and inflation of the inflatable membrane with the attached skin forms a desired final shape. For example, and with reference to FIG. 4, a skin 300 manufactured with a textured surface 302 that has or mimics the space-filling Turing pattern 270 is shown and an inflatable membrane 400 to which the skin 300 can be attached to is shown in FIG. 5. In some variations, the skin 300 includes one or more end portions 304, a mid-portion 306, and one or more portions 305 extending between an end portion 304 and a mid-portion 306. And in at least one variation the skin 300 includes a fastener 308, e.g., a zipper, hook and loop fastener, among others.

Figure 6:
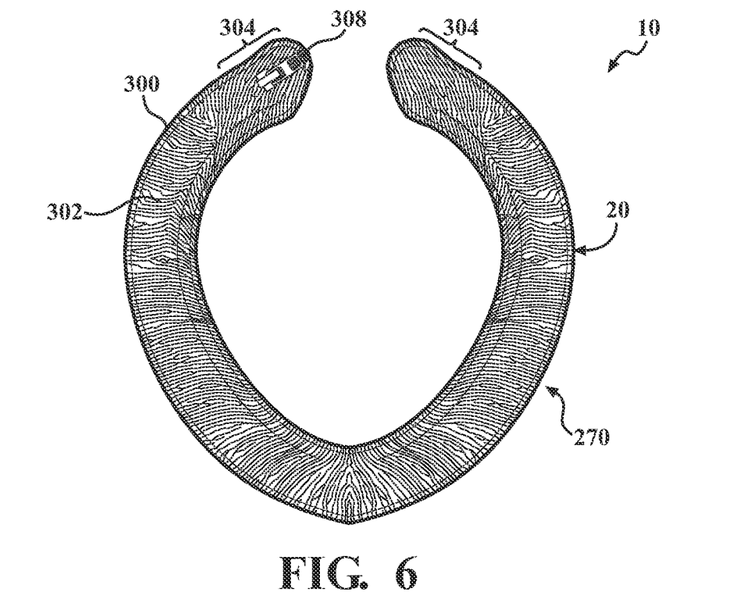
FIG. 6 is a side view of an inflatable shape-morphing structure according to the teachings of the present disclosure.

In some variations the skin 300 with the textured surface 302 is permanently bonded to the inflatable membrane 400. Non-limiting examples of techniques or methods to permanently bond the skin 300 to the inflatable membrane 400 include the use of adhesives to bond or glue the skin 300 to an outer surface 402 or an inner surface 404 of the inflatable membrane 400 or sewing of the skin 300 onto the inflatable membrane 400. In other variations, the skin 300 with the textured surface 302 is removably disposed on the outer surface 402 or the inner surface 404 of the inflatable membrane 400. For example, in some variations the skin 300 and the inflatable membrane 400 are dimensioned such that the skin 300 slides over and onto the inflatable membrane 400 before and/or after the inflatable membrane 400 is inflated. It should be understood that whether the skin 300 is permanently bonded to the inflatable membrane 400 or whether the skin 300 is removably disposed on the inflatable membrane 400, the inflatable structure 10 has the desired final shape 20 when the inflatable membrane 400 is inflated as shown in FIG. 6.

Figure 7:
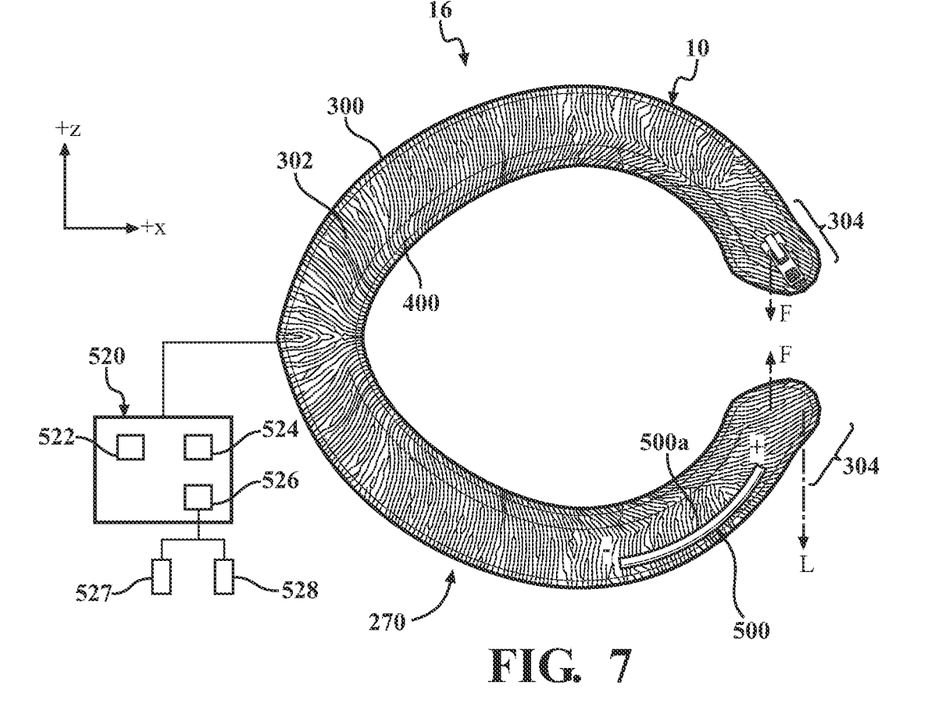
FIG. 7 is a side view of an inflatable shape-morphing structure with a variable stiffness device according to the teachings of the present disclosure.

Referring now to FIG. 7, in one form of the present disclosure an inflatable structure 16 includes the inflatable structure 10 discussed above and a variable stiffness device 500 that is or can be independently controlled or activated such that the strength or stiffness of the inflatable structure 10 is enhanced. That is, the inflatable structure 10 with the texture space-filling Turing pattern 270 is formed as single unit and the variable stiffness device 500 is added and mechanically couped to the inflatable structure 10. In another form of the present disclosure, an inflatable structure 16 includes the skin 300 with the textured surface 302 either permanently bonded to removably disposed on the inflatable membrane 400, and the variable stiffness device 500 mechanically couped to the skin 300 and/or inflatable membrane 400. In either form, it should be understood that the strength of stiffness of the variable stiffness device 500 is transferred to and used to provide support, strength, and/or stiffness to the inflatable structure 16.

In some variations, the variable stiffness device 500 is a variable stiffness filament 500a configured to change stiffness upon activation and de-activation from an external source. For example, in some variations the inflatable structure 16 is in communication with a control module 520 with an energy source 522, a coolant source 524, and/or a fluid pump 526. And in at least one variation, the energy source 522 is an electrical energy source 522 configured to apply an electrical current to the variable stiffness filament 500a such that the variable stiffness filament 500a is heated via Joule heating. In this manner the energy source 522 heats the variable stiffness filament 500a from a first temperature (e.g., room temperature: 20-22° C.) to a second temperature (e.g., 30° C.) that is greater than the first temperature. In addition, the variable stiffness filament 500a is configured to have a first stiffness at the first temperature and a second stiffness different than the first stiffness at the second temperature.

In some variations, the variable stiffness filament 500a is a metallic filament and Joule heating of the variable stiffness filament 500a results in the variable stiffness filament 500a decreasing in stiffness and/or strength. And decreasing the strength or stiffness of the variable stiffness filament 500a reduces support provided by the variable stiffness filament 500a to the inflatable structure 16 such that the strength or amount of pressure applied by the inflatable structure 16 on an object (i.e., a force 'F' applied by the end portions 304 and represented by the dotted line arrows) in an inflated state decreases and/or the load bearing capacity of the inflatable structure 16 (i.e., a load 1'L' that can be supported by an end portion 304 and represented by the double-lined arrow) is reduced, compared to when the variable stiffness filament 500a is not heated.

In the alternative, or in addition to, the inflatable structure 16 can be in fluid communication with the coolant source 524 and the coolant source 524 is configured to apply or flow coolant to or over the variable stiffness filament 500a such that the variable stiffness filament 500a is cooled (i.e., heat is extracted from the variable stiffness filament 500a). In this manner the coolant source 524 decreases a temperature of the variable stiffness filament 500a from a first temperature (e.g., room temperature) to a second temperature (e.g., 10° C.) that is less than the first temperature. In addition, the variable stiffness filament 500a is configured to have a first stiffness at the first temperature and a second stiffness different than the first stiffness at the second temperature. In variations where the variable stiffness filament 500a is a metallic filament, cooling of the variable stiffness filament 500a results in the variable stiffness filament 500a increasing in stiffness and/or strength such that the strength or amount of pressure applied by the inflatable structure 16 on an object in an inflated state increases and/or the load bearing capacity of the inflatable structure 16 is increased.

In some variations, the energy source 522 and the coolant source 524 are both in communication with the variable stiffness filament 500a such that the variable stiffness filament 500a is heated and cooled as described above and the strength or stiffness of the variable stiffness filament 500a is desirably changed. And while the variable stiffness filament 500a is only shown on the lower (−z direction) end portion 304 of the inflatable structure 16, it should be understood that an identical or similar variable stiffness filament can be included and attached to the upper (+z direction) end portion 304 of the inflatable structure 16.

In at least one variation, the variable stiffness filament 500a is formed from a shape memory alloy. And in such variations, the energy source 522 and/or the coolant source 524 are employed to increase and decrease a temperature of the variable stiffness filament 500a such that the variable stiffness filament 500a has a first shape at a first temperature and a second shape different than the first shape at a second temperature different than the first temperature. And while the variable stiffness filament 500a formed from the shape memory alloy may not have a different stiffness when at the first temperature compared to when at the second temperature, the inflatable structure 16 has a first stiffness when the variable stiffness filament 500a (formed from the shape memory alloy) is at the first temperature and a second stiffness different than the first stiffness when the variable stiffness filament 500a is at the second temperature.

Non-limiting examples of the metallic filament including filaments formed from iron, iron alloys (e.g., steel and stainless steel) nickel, nickel alloys copper, copper alloys, titanium, titanium alloys, aluminum, aluminum alloys, among others. In at least one variation, the variable stiffness filament 500a is formed from steel, while in another variation the variable stiffness filament 500a is formed from a shape memory alloy such as Nitinol.

Figure 8:
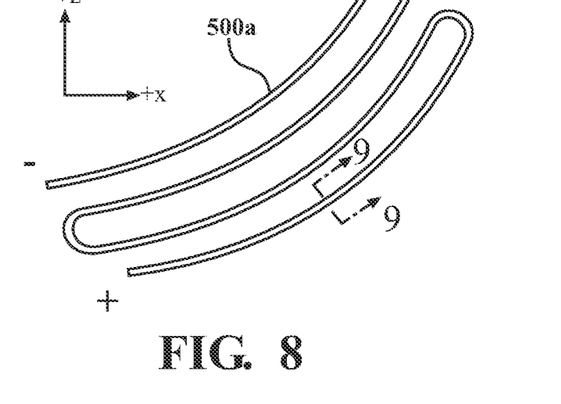
FIG. 8 is a side view of a variable stiffness filament according to the teachings of the present disclosure.
Figure 9:
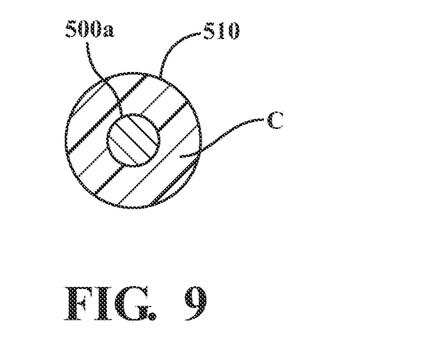
FIG. 9 is a view of section 9-9 in FIG. 8.

Referring to FIG. 8, in some variations the variable stiffness filament 500a has a serpentine and/or coil shape, and as shown in FIG. 9, the variable stiffness filament 500a can be disposed within an outer enclosure 510 (e.g., a tube) such that coolant 'C' flows through the outer enclosure 51) in contact with the variable stiffness filament 500a and thereby cools the variable stiffness filament 500a via conduction. In the alternative, or in addition to, the fluid pump 526 can be configured to pump heated fluid 527 and/or cooled fluid 528 through the outer enclosure 510 such that the variable stiffness filament 500a is heated and cooled as described above and the strength or stiffness of the variable stiffness filament 500a and/or inflatable structure 16 is desirably changed.

Figure 10:
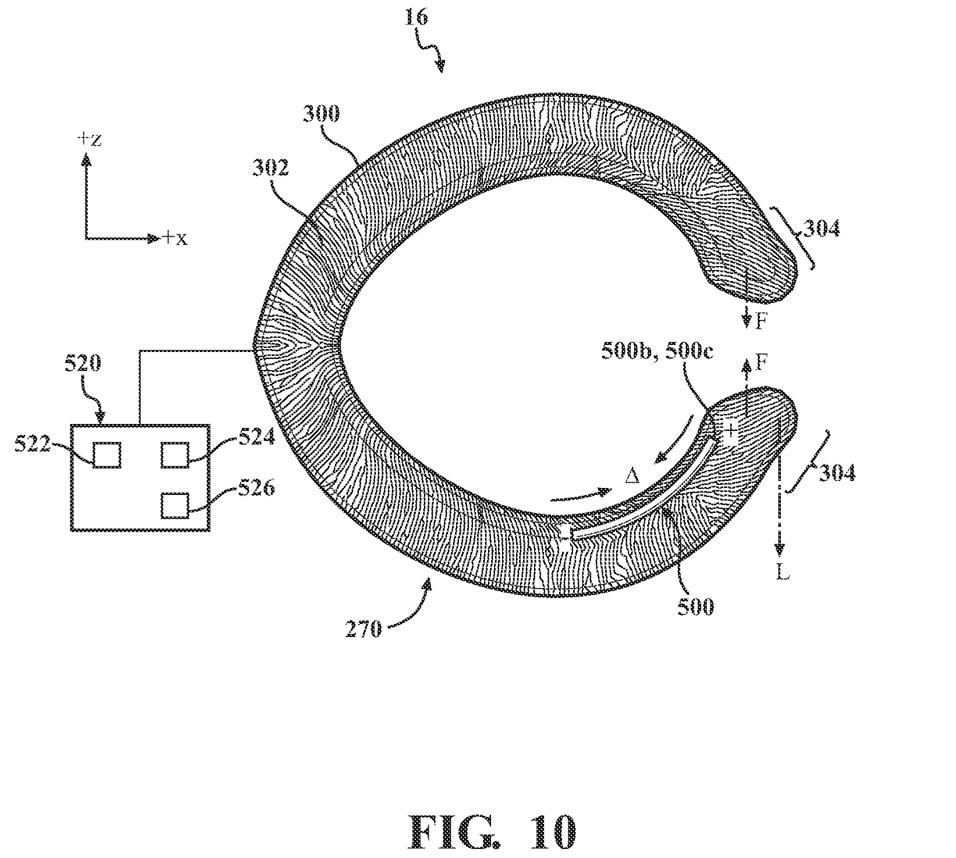
FIG. 10 is a side view of another inflatable shape-morphing structure with a variable stiffness device according to the teachings of the present disclosure.

Referring to FIG. 10, in some variations the variable stiffness device 500 is an electrostatic clutch 500b, while in other variations the variable stiffness device 500 is a jamming device 500c. In variations where the variable stiffness device 500 is an electrostatic clutch 500b, the electrostatic clutch 500b can include thin electrode sheets coated with or separated by a dielectric material as disclosed in the publication Diller et al., "A lightweight, low-power electroadhesive clutch and spring for exoskeleton actuation," 2016 IEEE International Conference on Robotics and Automation (ICRA), 2016, pp. 682-689, which is incorporated herein by reference. In addition, the energy source 522 can be configured to apply a voltage to the electrode sheets such that the electrode sheets are attracted to and "clamped" to each other such the length (x-z direction) of the electrostatic clutch 500b is inhibited from increasing. Accordingly, the electrostatic clutch 500b resists movement of the end portion 304 in the downward direction (−z direction) shown in the figure. That is, the electrostatic clutch 500b increases the strength or stiffness of the inflatable structure 16. And while the electrostatic clutch 500b is only shown on the lower (−z direction) end portion 304 of the inflatable structure 16, it should be understood that an identical or similar electrostatic clutch can be included and attached to the upper (+z direction) end portion 304 of the inflatable structure 16.

In variations where the variable stiffness device 500 is jamming device 500c, the jamming device 500c can include a collapsible tube with locking features as disclosed in the publication Yang et al. "Reprogrammable soft actuation and shape-shifting via tensile jamming" Sci. Adv. 2021; 7, which is incorporated herein by reference. In addition, the fluid pump can be configured to pull a vacuum on and collapse the tube such that the locking features engage and the length (x-z direction) of the jamming device 500c is inhibited from increasing. Accordingly, the jamming device 500c resists movement of the end portion 304 of the inflatable structure 16 from moving in the z-direction shown in the figure. That is, the jamming device 500c increases the strength or stiffness of the inflatable structure 16. And while the jamming device 500c is only shown on the lower (−z direction) end portion 304 of the inflatable structure 16, it should be understood that an identical or similar electrostatic clutch can be included and attached to the upper (+z direction) end portion 304 of the inflatable structure 16.

The foregoing description is merely illustrative in nature and is no way intended to limit the disclosure, its application, or uses. Also, work of the presently named inventors, to the extent it may be described in this background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An inflatable structure comprising:
   an inflatable membrane with a surface and a textured space-filling Turing pattern disposed on the surface; and
   a variable stiffness device coupled to and configured to actively control a stiffness of the inflatable membrane.

2. The inflatable structure according to claim 1, wherein the surface is an outer surface and the textured space-filling Turing pattern is permanently bonded to the outer surface.

3. The inflatable structure according to claim 1, wherein the surface is an outer surface and the textured space-filling Turing pattern is removably disposed on the outer surface.

4. The inflatable structure according to claim 1, wherein the inflatable membrane comprises a fabric with the surface and a skin with the textured space-filling Turing pattern, the skin being disposed on the surface of the fabric.

5. The inflatable structure according to claim 4, wherein the fabric is a tube, the surface is an outer surface, and the skin with the textured space-filling Turing pattern is permanently bonded to the outer surface of the tube.

6. The inflatable structure according to claim 4, wherein the fabric is a tube, the surface is an outer surface, and the skin with the textured space-filling Turing pattern is removably disposed on the outer surface of the tube.

7. The inflatable structure according to claim 1, wherein the variable stiffness device is a variable stiffness filament comprising a stiffness as a function of temperature.

8. The inflatable structure according to claim 7, wherein the variable stiffness filament is a metallic filament.

9. The inflatable structure according to claim 8 further comprising an electrical energy source in electrical communication with the metallic filament.

10. The inflatable structure according to claim 9, wherein the electrical energy source is configured to apply Joule heating to and increase a temperature of the metallic filament.

11. The inflatable structure according to claim 10 further comprising a coolant source in fluid communication with the metallic filament, the coolant source configured to apply coolant to and decrease the temperature of the metallic filament.

12. The inflatable structure according to claim 1, wherein the variable stiffness device is an electrostatic clutch.

13. The inflatable structure according to claim 1, wherein the variable stiffness device is a jamming device.

14. The inflatable structure according to claim 1, wherein the inflatable membrane comprises a mid-portion and an end portion, and the variable stiffness device extends between the mid-portion and the end portion.

15. The inflatable structure according to claim 1, wherein the variable stiffness device is a variable stiffness filament comprising a first stiffness at a first temperature and a second stiffness different than the first stiffness at a second temperature different than the first temperature, and the variable stiffness filament with the second stiffness configured to increase a load bearing capacity of the inflatable structure compared to the variable stiffness filament with the first stiffness.

16. An inflatable structure comprising:
    an inflatable membrane with a surface and a skin with a textured space-filling Turing pattern, the skin being disposed on the surface of the inflatable membrane; and
    a variable stiffness filament coupled to and configured to actively control a stiffness of the inflatable membrane.

17. The inflatable structure according to claim 16, wherein the skin with the textured space-filling Turing pattern is permanently bonded to the surface of the inflatable membrane.

18. The inflatable structure according to claim 16, wherein the skin with the textured space-filling Turing pattern is removably disposed on the surface of the inflatable membrane.

19. An inflatable structure comprising:
    an inflatable membrane comprising a fabric with an outer surface and a skin with a textured space-filling Turing pattern, the skin with the textured space-filling Turing pattern being at least one of permanently bonded to the outer surface of the fabric and removably disposed on the outer surface of the fabric;
    a variable stiffness filament coupled to and configured to actively control a stiffness of the inflatable membrane, the variable stiffness filament comprising a first stiffness at a first temperature and a second stiffness different than the first stiffness at a second temperature different than the first temperature; and
    an electrical energy source in electrical communication with the variable stiffness filament, the electrical energy source configured to apply Joule heating to and increase a temperature of the variable stiffness filament from the first temperature to the second temperature.

20. The inflatable structure according to claim 19 further comprising a coolant source in fluid communication with the variable stiffness filament, the coolant source configured to apply coolant to and decrease the temperature of the variable stiffness filament.

* * * * *